United States Patent

[11] 3,610,853

| [72] | Inventor | Raymond A. Reznicek<br>St. Joseph, Mich. |
|---|---|---|
| [21] | Appl. No. | 670 |
| [22] | Filed | Jan. 5, 1970 |
| [45] | Patented | Oct. 5, 1971 |
| [73] | Assignee | The Bendix Corporation |

[54] LATCHING PRESSURE DIFFERENTIAL SWITCH WITH RESET PLUNGER
4 Claims, 2 Drawing Figs.

[52] U.S. Cl. ........................................ 200/82 D, 200/153 LA
[51] Int. Cl. ..................................... H01h 35/38
[50] Field of Search ............................. 200/82 D, 153 LA, 166 SD, 61.41, 61.59, 61.66, 169, 82, 83 J; 340/52 C, 60

[56] References Cited
UNITED STATES PATENTS

| 3,228,194 | 1/1966 | Blair | 200/82 D UX |
| 1,401,652 | 12/1921 | Scully | 200/166 SD UX |
| 1,537,078 | 5/1925 | Goldman | 200/153 (.12) UX |
| 2,366,474 | 1/1945 | Bentley | 200/153 (.12) UX |
| 2,895,027 | 7/1959 | Ball | 200/169 X |
| 3,369,090 | 2/1968 | Turchau | 200/82 (.3) |
| 3,475,573 | 10/1969 | Maltais et al. | 200/82 (.3) |

FOREIGN PATENTS

| 927,579 | 4/1955 | Germany | 200/153 (.12) |

Primary Examiner—H. O. Jones
Assistant Examiner—Robert A. Vanderhye
Attorneys—William N. Antonis and Plante, Arens, Hartz, Smith & Thompson ABSTRACT: A differential pressure warning switch for use in a vehicular braking system to indicate a malfunction thereof has a latching mechanism engaging the switch arm so that, when activated, the warning device remains activated after the brakes are released. When the malfunction is corrected, the mechanic moves a plunger extending from the housing to return the switch arm to its unactivated position.

PATENTED OCT 5 1971

INVENTOR.
RAYMOND A. REZNICEK
BY Plante, Arens,
Hartz, Smith & Thompson
ATTORNEYS

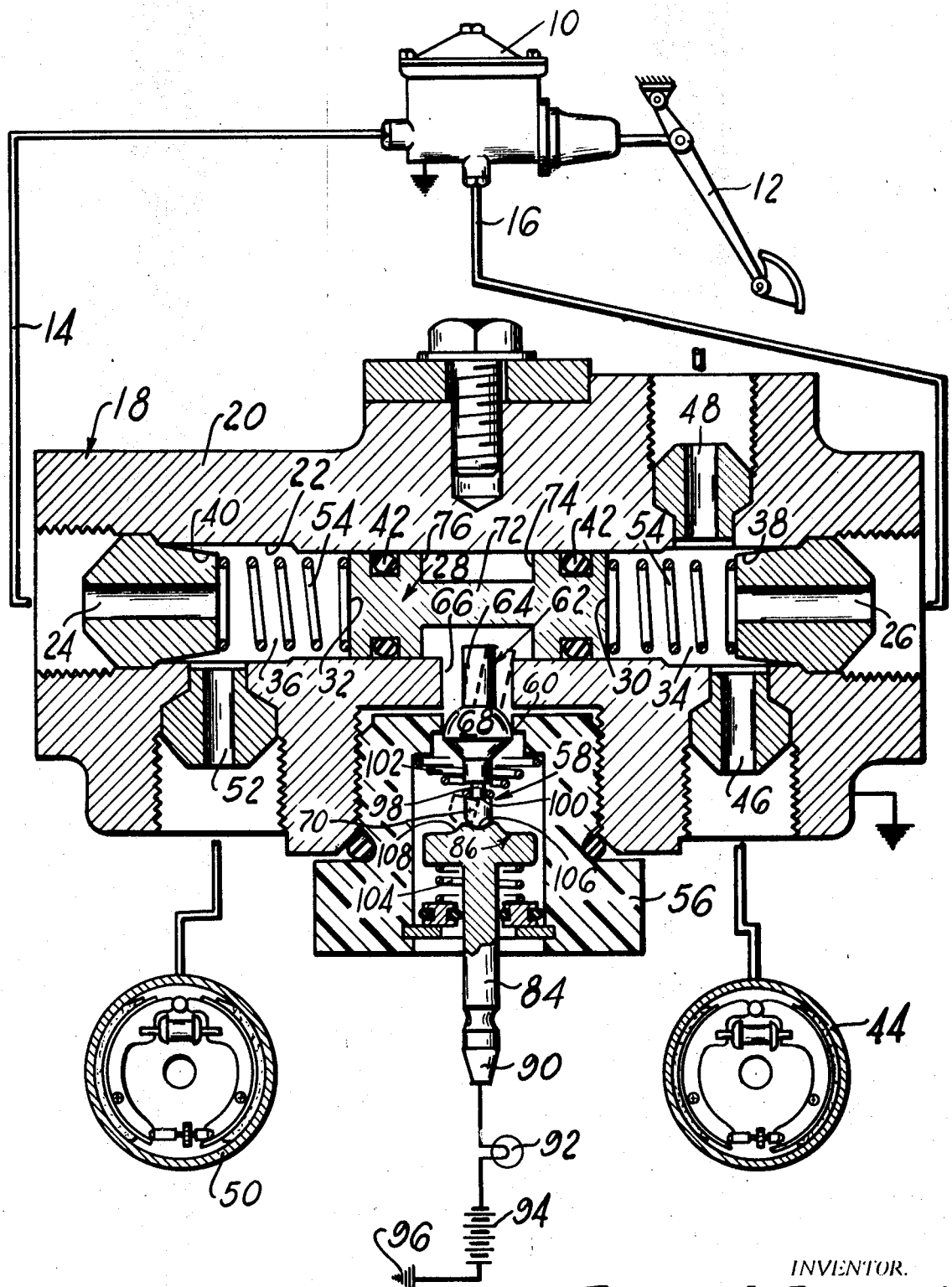

:::: {#page-1 .page}
LATCHING PRESSURE DIFFERENTIAL SWITCH WITH RESET PLUNGER

BACKGROUND OF THE INVENTION

This invention relates to warning devices to indicate loss of pressure in one side of a dual hydraulic vehicular braking system.

In a vehicle having a split system master cylinder, two separate fluid systems connect the master cylinder to a respective set of front and rear brakes for simultaneously activating the same. If the hydraulic system for one set of brakes should fail, the other set of brakes will still operate. While greater pedal effort is required to stop a vehicle by using only one set of brakes, the operator might not realize that one of the hydraulic systems is inoperative. It is therefore desirable to provide a warning device in the driver's compartment to indicate a failure in the brake system. However, most existing warning devices operate only while the brakes are applied. Even if one of the systems has failed completely, the vehicle operator is appraised of this fact only during a brake application. It is therefore desirable to provide a warning device that, once activated by a failure in the hydraulic system, continuously warns the driver of the existing failure until the device is reset by the mechanic when the system is repaired.

SUMMARY OF THE INVENTION

Therefore, an important object of my present invention is to provide a vehicular braking system malfunction indicator that upon actuation by a difference in hydraulic pressure in one side of a dual hydraulic system continuously warns the vehicle driver until reset.

Another important object of my invention is to provide a latching warning switch for indicating a malfunction in a vehicular braking system that may be quickly and easily reset when the system is repaired without disassembly of the switch itself or bleeding of the brake lines.

DESCRIPTION OF THE DRAWINGS

FIG. 2 is a cross-sectional view of a modified embodiment illustrated schematically in a dual hydraulic braking system for a vehicle.

DETAILED DESCRIPTION

Figure 1:
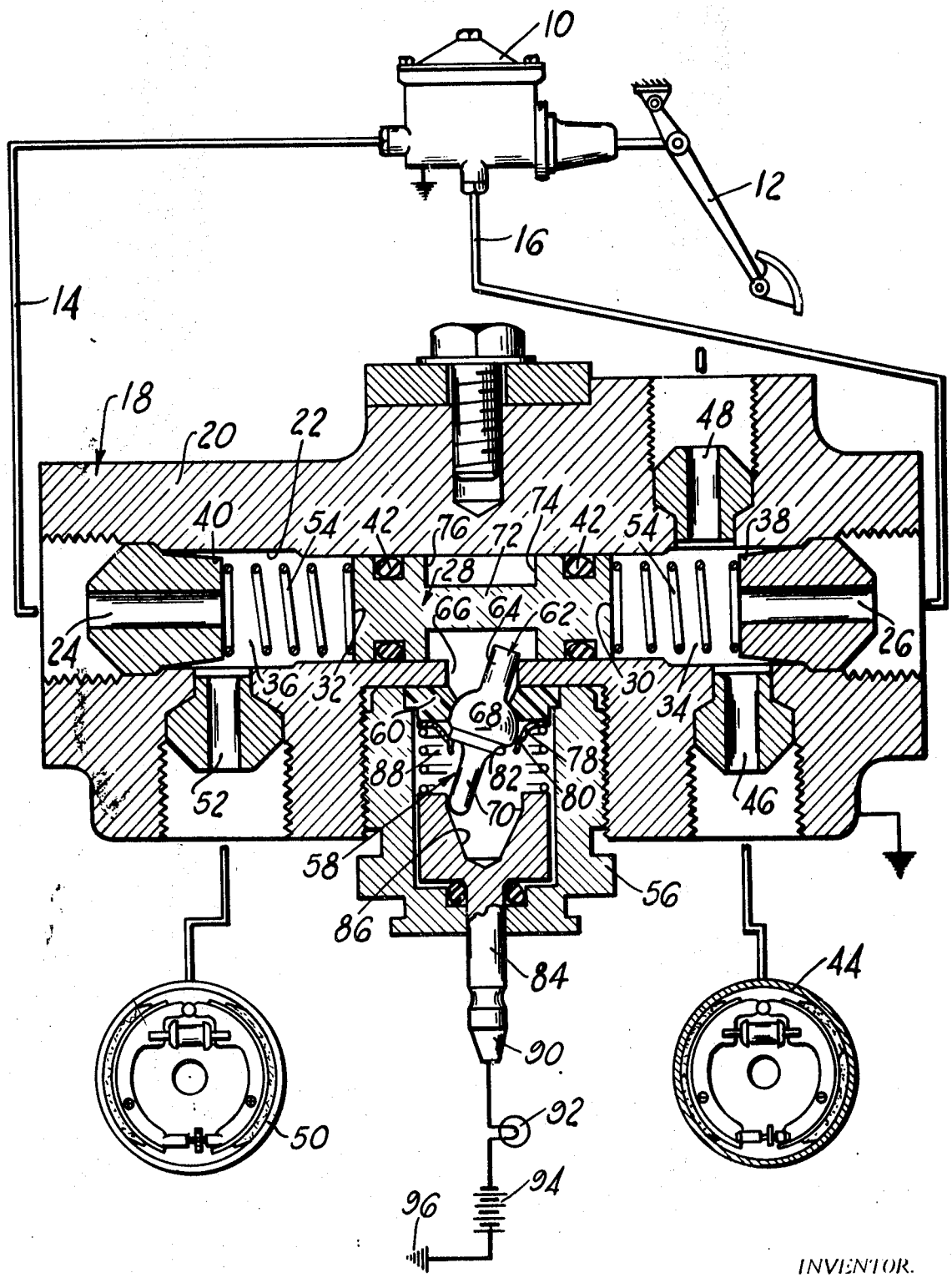
FIG. 1 is a cross-sectional view of a warning switch made pursuant to the teachings of my present invention illustrated schematically with the brakes and master cylinder associated therewith.

Referring now to FIG. 1, fluid pressure is developed in a master cylinder 10 by operation of a pedal 12 mounted in the vehicle operator's compartment. Master cylinder 10 is of the split system type and therefore develops pressure in each of a pair of hydraulic systems 14 and 16. Each of the hydraulic systems 14 and 16 are connected to opposite sides of a differential pressure warning switch 18 which is mounted at any convenient place on the vehicle, such as the firewall, where the switch 18 may be electrically grounded.

Switch 18 includes a housing 20 defining a bore 22 therewithin communicating with inlet ports 24, 26 that are connected to the corresponding hydraulic systems 14 and 16, respectively. A piston 28 has a pair of oppositely directed faces or opposed end portions 30 and 32 which divide the bore into a pair of chambers 34 and 36 defined by respective ones of the end portions 30 and 32 and associated end walls or members 38 and 40 of the bore 22. Appropriate seals 42 are provided between the piston 28 and bore 22 to prevent escape of fluid from the chambers 34 and 36. Chamber 34 is connected to each of the front wheel brakes (only one of which is shown at 44) through outlet ports 46 and 48. Chamber 36 communicates fluid to each of the rear brakes (only one of which is shown at 50) through the outlet port 52. Springs 54, provided in each of the chambers 34 and 36, center the piston 28 within the bore 22.

Housing 20 threadedly receives a fitting 56 which contains a switch mechanism 58. Fitting 56 is provided with a resilient, electrically nonconductive seat member 60 which receives a pivotally mounted switch arm 62. Switch arm 62 has a first elongated portion 64 that extends into the bore 22 through an opening 66 in the housing 20. The opening 66 is of substantially larger diameter than the elongated portion 64 of the arm 62 to allow for angular movement of the latter. Switch arm 62 further includes an enlarged, ball-like portion 68 that engages the seat 60, and a second elongated portion 70 extending from the enlarged portion 68 in a direction opposite to that of the first portion 64. Piston 28 is provided with a web 72 interconnecting the faces 30 and 32 and forming shoulders 74 and 76 with the end portions 30 and 32 respectively. Engagement of one of the shoulders 74 or 76 with the portion 64 shifts the switch arm 62 from a position in which the portion 64 is concentric with the opening 66 to a position in which the arm 62 engages the housing 22, as illustrated in FIG. 1.

A pair of resilient members or arms 78 are mounted on the seat 60 and have detents or ribs 80 that are adapted to engage corresponding recesses or grooves 82 in the enlarged portion 68. A plunger 84 extends from the fitting 56 and has a camming surface 86 formed on one end thereof that is adapted to engage the portion 70. Plunger 84 slides axially with respect to the fitting 56 and a spring 88 yieldably biases the plunger away from the arm 62. The other end of the plunger 84 is formed into an electrical contact 90 which is connected in series with a warning device in the operator's compartment, such as a light bulb 92, with the vehicle's battery 94, and with an electrical ground 96.

In the alternate embodiment of FIG. 2, elements substantially the same as those of the embodiment of FIG. 1 retain the same reference character. Portion 70 of switch arm 62 includes a neck 98 forming a shoulder 100. A conical spring 102 engages the fitting 56 and the shoulder 100 and resiliently biases the switch arm 62 toward a position in which the portion 69 is concentric with the opening 66. A spring 104 urges the camming surface 86 of plunger 84 into engagement with the portion 70. Camming surface 86 has a central recess 106 and a pair of side recesses 108 formed therein each of which is adapted to engage the end of the switch arm 62.

MODE OF OPERATION

Assuming no malfunction in the brake hydraulic system, the piston 28 is initially centered in the bore 22 due to the action of the springs 54. Portion 64 of switch arm 62 extends into the bore 22 concentric with the opening 66. Since the seat 60 insulates the switch 62 from the ground established by the housing 20, the electrical circuit through the switch arm 62, resilient members 78, spring 88, plunger 84, light bulb 92 and battery 94 will be open and light bulb 92 will not function. However, if a malfunction in either of the hydraulic system 14 or 16 causes a loss of pressure in one of the chambers 34 and 36, pressure in the other chamber forces the piston 28 to shift in the bore. Contact of one of the shoulders 74 or 76 with the switch arm 62 forces the latter into an actuated position where the portion 64 contacts the housing 20. Since the housing 20 is grounded electrically, this action completes an electrical circuit through the light bulb 92, lighting the latter.

In prior art devices, a malfunction in the hydraulic system actuated a warning device only during a brake application, since upon release of the brakes the springs 54 would recenter piston 28 in the bore 22, thus permitting the switch arm 62 to break contact with the housing 22. In the device illustrated in FIG. 1, however, the resilient members 78 lock the arm 62 in the actuated position, until the mechanism 58 is manually reset. To reset the device, the plunger 84 is forced inwardly against the action of the spring 88. Camming surfaces 86 then engage the portion 70 to force the switch arm 62 into a vertical position. At this time, detents 80 engage the recess 82 to latch the switch 62 in its base position. This latching action insures that the switch 58 will only be activated by a brake mal-
::::

function, since otherwise the switch might be inadvertently actuated by normal road vibrations.

In the embodiment of FIG. 2, movement of piston 28 forces the switch arm 62 against the housing 20 as described above to complete an electrical circuit to actuate the warning device 92. Movement of the switch arm 62 forces the portion 70 from the central recess 106 of plunger 84 and into one of the adjacent recesses 108. The action of spring 108 maintains plunger 84 in engagement with the portion 70, thus locking the switch arm 62 in engagement with the housing 20. The device may be easily reset upon repair of the vehicle by moving plunger 84 downwardly against the spring 104 to disengage the portion 70 from the recess 108. The action of conical spring 102 then returns switch arm 62 to its base position with the portion 64 extending concentrically through the opening 66, thereby breaking the electrical circuit and deactivating the warning device.

I claim:

1. In a switch responsive to differential pressure between first and second hydraulic systems:
   a housing defining a bore therewithin;
   a piston in said bore having a pair of opposed faces;
   first and second chambers in said bore defined by respective faces on the piston and corresponding ends of the bore;
   said first and second chambers being in fluid communication with said first and second hydraulic systems, respectively;
   said piston being slidable in said bore in response to a pressure differential between said first and second chambers;
   a switch arm carried by the housing extending into said bore and adapted to activate a warning signal mechanism upon displacement of the switch arm by said piston from a base position to an actuated position;
   latch means engaging said arm when moved to said actuated position for maintaining the latter in said actuated position; and
   a plunger projecting from said housing cooperating with said switch arm to move the latter from the actuated position to the base position upon movement of said plunger.

2. The invention of claim 1:
   said housing having an opening extending into said bore;
   said switch arm having an enlarged portion pivotally carried on the housing at said opening, a first elongated portion extending through said opening into said bore for engagement by the piston, a second elongated portion extending away from said bore;
   said latch means being a camming surface on said plunger in said housing engaging said second portion and adapted to retain said switch arm in the actuated position;
   spring means yieldably biasing said plunger into engagement with said switch arm; and
   resilient means engaging said second portion adapted to return said arm to the base position when said plunger is manually moved against the bias of said spring means out of contact with said second portion.

3. The invention of claim 1:
   said housing having an opening extending into said bore;
   said switch arm having an enlarged portion pivotally carried on the housing at said opening, a first elongated portion extending through said opening into said bore for engagement by the piston, a second elongated portion extending away from said bore;
   said latch means being a resilient member carried by the housing;
   said member having a detent adapted to engage a recess in said enlarged portion to lock the arm in said base position until shifted to said actuated position by movement of the piston, whereupon the member releasably maintains the arm in the actuated position.

4. The invention of claim 3:
   said plunger having a camming surface thereon adapted to engage said switch arm;
   spring means in the housing yieldably biasing said plunger away from said switch arm;
   said camming surface being adapted to force the switch arm to the base position when said plunger is moved against the action of the spring means.